June 17, 1958　　　H. W. DAVIS　　　2,838,901
TRACTOR MOUNTED ROTATING DISK CUTTING
ASSEMBLY WITH OVERLOAD RELEASE MEANS
Filed May 10, 1957　　　　　　　　　　　　2 Sheets-Sheet 1
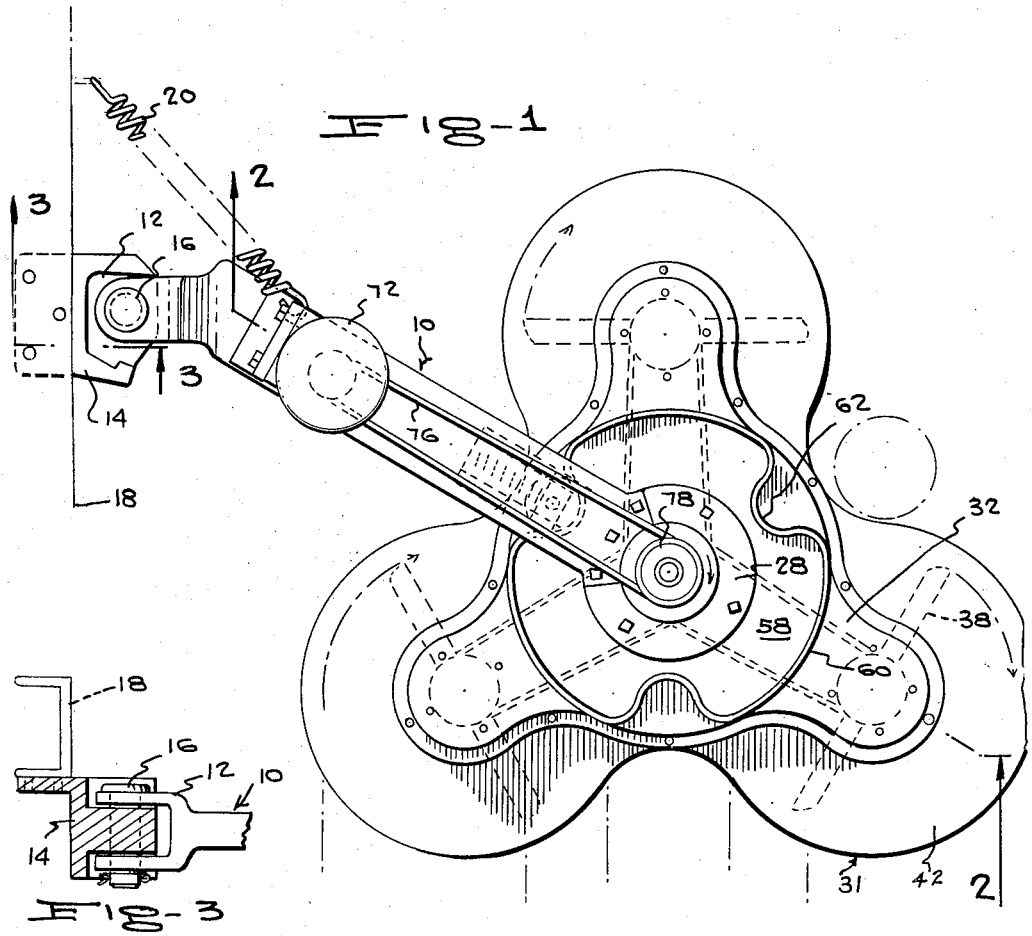
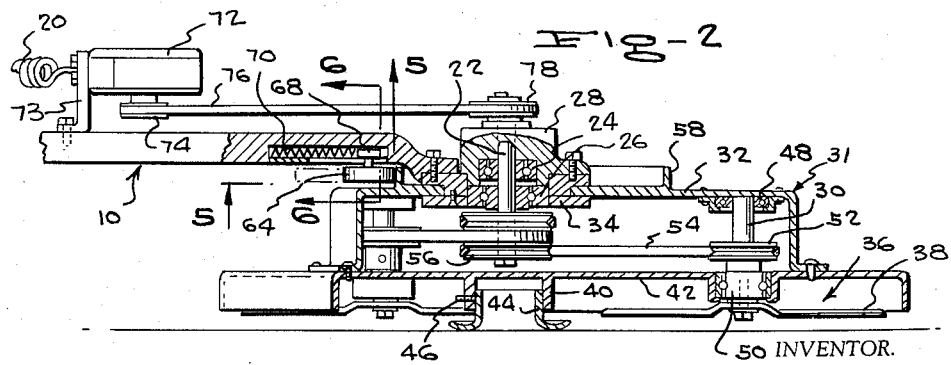
INVENTOR.
HERBERT W. DAVIS
BY
McMorrow, Berman & Davidson
ATTORNEYS June 17, 1958 H. W. DAVIS 2,838,901
TRACTOR MOUNTED ROTATING DISK CUTTING
ASSEMBLY WITH OVERLOAD RELEASE MEANS
Filed May 10, 1957 2 Sheets-Sheet 2
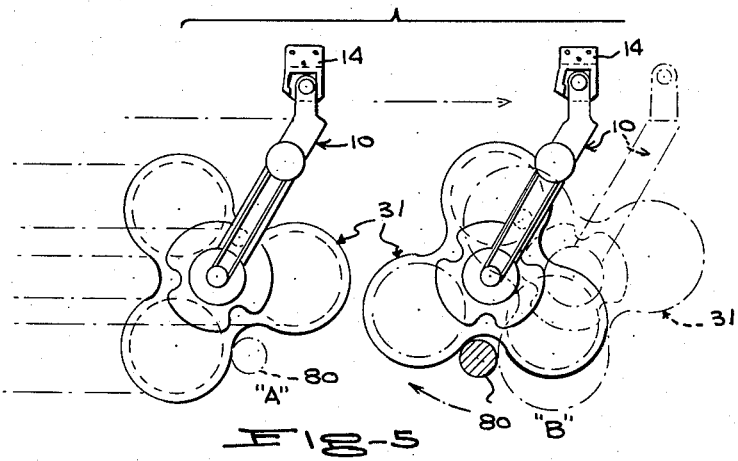
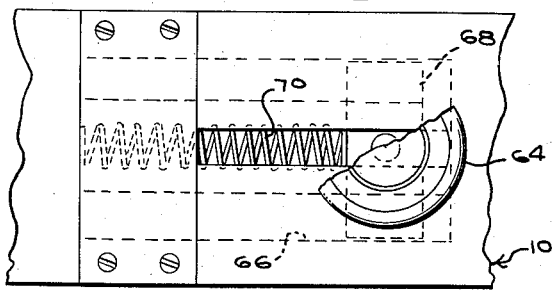
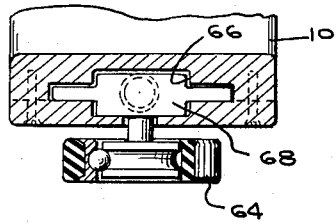
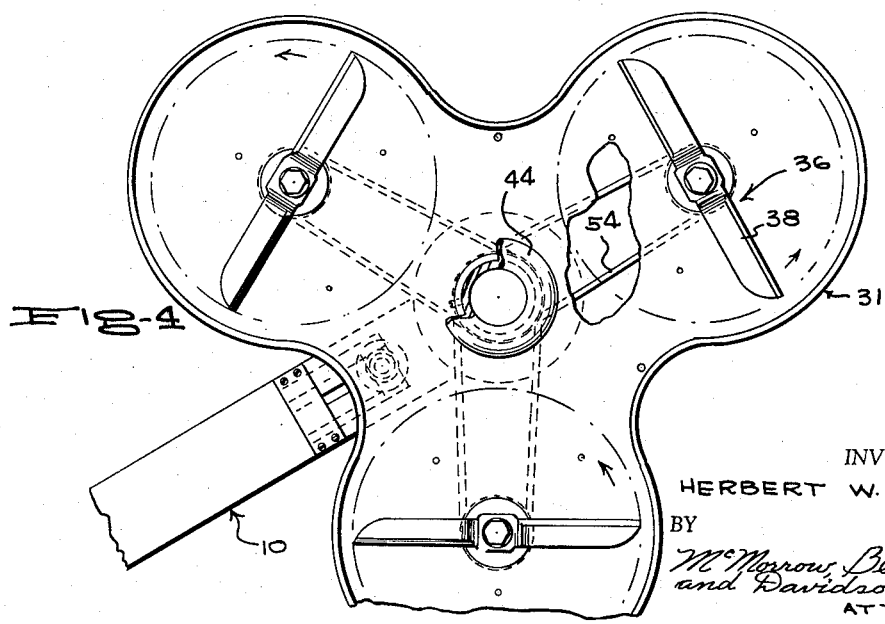
INVENTOR.
HERBERT W. DAVIS
BY
McMorrow, Berman
and Davidson
ATTORNEYS

United States Patent Office 2,838,901
Patented June 17, 1958

2,838,901

TRACTOR MOUNTED ROTATING DISK CUTTING ASSEMBLY WITH OVERLOAD RELEASE MEANS

Herbert W. Davis, Hackettstown, N. J.

Application May 10, 1957, Serial No. 658,407

5 Claims. (Cl. 56—25.4)

The present invention relates to a mower attachment for a work vehicle.

An object of the present invention is to provide a mower attachment for a work vehicle which lends itself to the efficient mowing of grass and weeds under guard rails along the sides of the roadways, and the like.

Another object of the present invention is to provide a mower attachment for a work vehicle which obviates the necessity of hand trimming of the grass or weeds close to the posts which support a guard rail along a roadway, and one which mows such grass or weeds from substantially the entire area about such a post.

A further object of the present invention is to provide a mower attachment for a work vehicle which is readily and easily attached to the work vehicle and detached therefrom, one which is sturdy in construction and of few parts, and one which is economically practical.

These and other objects and advantages of the present invention will be fully apparent from the following description when taken in connection with the annexed drawings, in which:

Figure 1 is a top plan view of the mower attachment according to the present invention;

Figure 2 is a sectional view, taken on the line 2—2 of Figure 1;

Figure 3 is a sectional view, taken on the line 3—3 of Figure 1;

Figure 4 is a partial bottom plan view;

Figure 5 is a view partially in section, on an enlarged scale, taken on the line 5—5 of Figure 2;

Figure 6 is a view in section, on an enlarged scale, taken on the line 6—6 of Figure 2; and Figure 7 is a diagrammatic view showing the action of the mower attachment according to the present invention as it encounters a fixed object in its path of mowing attachment over a ground surface.

Referring in greater detail to the drawings in which like numerals indicate like parts throughout the several views, the mower attachment according to the present invention comprises an arm 10 having means on one end thereof for attachment to one side of the frame of a tractor or the frame of another working vehicle. This means may embody a bifurcation (Fig. 3) on said one end of the arm 10 pivotally connected to a bracket 14 by means of a pivot pin 16, the bracket 14 being dependingly carried upon a side frame member 18, the latter being shown in Figures 1 and 3.

The bracket 14 positions the arm 10 along one side of the work vehicle and at an angle with respect to the frame member 18. The pivot pin 16 connects the arm 10 to the frame member 18 for movement about a vertical axis and a coil spring 20 having one end attached to the arm 10 and the other end attached to the frame member 18 constitutes spring means operatively connected to the frame member 18 and biasing the arm 10 forwardly with respect to the work vehicle and to its position of angular relation with respect to the sides of the work vehicle.

The vertically disposed driven shaft 22 is rotatably journaled at its midportion in bearing assemblies 24 and 26 (Fig. 2) carried in a vertically extending recess provided in a hub 28 mounted upon the free end of the arm 10. A portion of the driven shaft 22 projects above the arm 10 and a portion adjacent the lower end projects below the arm 10.

A plurality of vertically disposed stub shafts 30 are positioned in spaced relation about the driven shaft 22 adjacent the lower end portion of the latter and are rotatably supported within an upstanding housing 31 which has its lower end open. The housing 31 is, as shown in Figures 1 and 4, cloverleaf shaped in plan view and is supported for free rotation of the driven shaft 22 in a channeled ring member 34.

The housing 31 comprises a first or upper housing 32 and a second or lower housing 42 mounted upon the upper housing 32. The housing 42 includes a closed end and an open end and is mounted upon the upper housing 32 so that the closed end bridges and closes the lower end of the upper housing 32 with the open end facing away from the upper housing 32 and exteriorly of the lower end of the upper housing 32.

A weed cutter 36 is carried on the lower end of each of the stub shafts 30 and has opposed blades 38 lying in a common horizontal plane which is within and adjacent to the open end of the lower housing 42.

The housing 32 serves to enclose the stub shafts 30 and the driving means from the driven shaft 22 to the shaft 30 and the second or lower housing 42 serves to mount the lower ends of the shafts 30 and to enclose the cutting blades 36. A collar 40 projects downwardly from the center of the closed end of the housing 42 and forms a means of support for a circular ground engaging shoe 44 adjustably secured therein by means of a set screw 46.

Bearing assemblies 48 and 50 support the upper and lower ends, respectively, of each of the stub shafts 30 for rotation within the housing 32. Means is provided connecting all of the stub shafts 30 to the driven shaft 22 for simultaneous rotation with the driven shaft 22, such means embodying pulleys 52 on each of the stub shafts 30 connected by flexible belts 54 to an associated pulley carried upon the driven shaft 22, the latter pulleys being three in number and designated by the reference numeral 56.

Cooperating releasable latching means is provided on the arm 10 and on the housing 32 for holding the housing 32 against rotation. Specifically, this means includes a cam trackway 58 mounted upon the upper end portion of the housing 32 and having a plurality of lobe portions 60 with a dwell portion 62 between each of the adjacent lobe portions 60. A latching element, constituting a freely rotatable roller 64, is supported in the trackway 58 and is normally releasably engaged with one of the dwell portions 62 for holding the housing 32 against rotation. The under portion of the arm 10 is provided with a slot 66 (Fig. 6) in which is slidably mounted a slide member 68 and a coil spring (Fig. 2) designated by the reference numeral 70 biasing the slide member 68 and the attached roller 64 to the position in which it is releasably held in one of the dwell portions 62.

Drive means is provided for the driven shaft 22 and in the preferred embodiment, a hydraulic motor 72 is mounted upon one leg of an L-shaped bracket 73 having its other leg fixedly secured to the intermediate portion of the arm 10, the motor 72 including a drive shaft and a pulley 74 on the drive shaft connected by a flexible belt 76 to a suitable pulley 78 mounted upon the upper end portion of the driven shaft 22. Other means may be used to drive the shaft 22 and a hydraulic motor may be mounted directly upon the upper end portion of such shaft or electrical driving means may be used as desired.

In operation, as shown in Figure 7, the portion of the housing 31 enclosing any of the cutters 36 upon encountering a fixed object such as a post 80, shown in position "A" in Figure 7, effects the release of the roller 64 from one of the dwell portions 62 in the trackway 58 and permits free rotating movement of the housing portion about the post 80 in the direction indicated by the arrow in a "B" position with the housing 32 shown in full lines in the start of such position and in dotted lines in a final position in which the roller 64 has entered the next adjacent dwell portion 62. This rotating movement of the housing 32 about the post 80 enables the cutter blades 38 to reach all of the grass and weeds which surround the post 80 for nearly the entire circumference of the post 80. The mower attachment of the present invention is therefore seen to be useful in cutting the grass and weeds below a guard rail mounted upon the post 80 with the area of cutting extended under and beyond the guard rail so as to enhance the appearance of the roadside with the grass and weeds cut from the sides of the roadside up to and beyond the guard rail and around the post which supports the latter. This is accomplished without extra attention by the operator of the work vehicle and should the housing 32 encounter a fixed object at a point which does not automatically rotate the housing 32, the arm 10 will swing upon the pivot pin 16 backwardly to release the housing 32 from its engagement with such fixed object and to allow it to slip off of the fixed object but cutting weeds and grass from the area around the fixed object without damage to the housing 32 or to the motor 72. The spring 20 serves to return the housing 32 to its position in which it is extended outwardly from the work vehicle.

The thus described mower attachment comprises the arm 10 adapted to be positioned along the side of the frame member 18, and means is provided which is adapted to connect the arm to the frame side or member 18 for swinging movement about a vertical axis. Preferably, such means embodying the bifurcation 12, the bracket 14 and the pin or vertical axis 16. Spring means is provided and is carried by the arm 10 and is adapted to be operatively connected to the frame side or member 18 for biasing the arm 10 toward the position outwardly of the frame side or member 18, said means embodying the coil spring 20.

The housing 32 is operatively connected to the arm 10 for free rotation about a vertical axis and constituting the driven shaft 22 carried by the arm 10. The plurality of rotatable weed cutters 36 are enclosed within the housing 31 and are carried by the housing 32, the cutters 36 lying in a common horizontal plane adjacent the open lower end of the housing 31 and being arranged in spaced relation at equal distances about the housing axis or driven shaft 22.

Each lobe portion 60 of the housing 32 encloses one of the cutters 36 and upon encountering a fixed object effecting the release of the latching roller 64 from the position normally in engagement with the adjacent dwell portion 62 and permitting free swinging movement of the one housing lobe portion 60 about the fixed object.

While the cutter blades are shown two in number for each cutter 36 and the cutters 36 shown as three in number, it is not intended that the present invention be limited to such construction and lobes may be provided in the housing 32 and the associated trackway 58 with the appropriate number of dwell portions in the trackway 58 and a like number of cutters 36, if desired. Similarly, while the arm 10 is shown at an angle to the frame member 18, the arm 10 may be positioned perpendicularly to such frame member or may be swung forwardly, as desired.

What is claimed is:

1. A mower attachment comprising an arm adapted to be positioned along and at an angle with respect to one side of a work vehicle frame, means on one end of said arm connecting said arm to said frame side for movement about a vertical axis, spring means carried by said arm and adapted to be operatively connected to said frame side for biasing said arm toward the angular position, a vertically disposed driven shaft rotatably journaled at its midportion in said arm adjacent the other end thereof and having the portion adjacent the upper end projecting above said arm and having the portion adjacent the lower end projecting below said arm, a plurality of vertically disposed stub shafts positioned in spaced relation about said driven shaft lower end portion, a weed cutter on the lower end of each of said stub shafts, said cutters lying in a common horizontal plane, an upstanding housing enclosing said stub shafts, said driven shaft lower end portion, and said cutters and connected to said driven shaft midportion for free rotation about said midportion as an axis, the lower end of said housing being open, said stub shafts being rotatably supported in said housing, means connecting all of said stub shafts to said driven shaft for simultaneous rotation with said driven shaft, a drive shaft carried by said arm, means drivingly connecting said drive shaft to said upper end projecting portion of said driven shaft, and cooperating releasable latching means on said arm and said housing for holding said housing against rotation, the portion of said housing enclosing any of said cutters upon encountering a fixed object effecting the release of said latching means and permitting free rotating movement of said housing portion about said object.

2. A mower attachment comprising an arm adapted to be positioned along and at an angle with respect to one side of a work vehicle frame, means on one end of said arm connecting said arm to said frame side for movement about a vertical axis, spring means carried by said arm and adapted to be operatively connected to said frame side for biasing said arm toward the angular position, a vertically disposed driven shaft rotatably journaled at its midportion in said arm adjacent the other end thereof and having the portion adjacent the upper end projecting above said arm and having the portion adjacent the lower end projecting below said arm, a plurality of vertically disposed stub shafts positioned in spaced relation about said driven shaft lower end portion, a weed cutter on the lower end of each of said stub shafts, said cutters lying in a common horizontal plane, an upstanding housing enclosing said stub shafts, said driven shaft lower end portion, and said cutters and connected to said driven shaft midportion for free rotation about said midportion as an axis, the lower end of said housing being open, said stub shafts being rotatably supported in said housing, means connecting all of the stub shafts to said driven shaft for simultaneous rotation with said driven shaft, a drive shaft carried by said arm, means drivingly connecting said drive shaft to said upper end projecting portion of said driven shaft, and a spring biased latching element on said arm and releasably engageable with one of a plurality of dwell portions formed on said housing, the portion of said housing enclosing any of said cutters upon encountering a fixed object effecting the release of said element from said one dwell portion and permitting free rotating movement of said housing portion about said object.

3. A mower attachment comprising an arm adapted to be positioned along and at an angle with respect to one side of a work vehicle frame, means on one end of said arm connecting said arm to said frame side for movement about a vertical axis, spring means carried by said arm and adapted to be operatively connected to said frame side for biasing said arm toward the angular position, a vertically disposed driven shaft rotatably journaled at its midportion in said arm adjacent the other end thereof and having the portion adjacent the upper end projecting above said arm and having the portion adjacent the lower end projecting below said arm, a plurality of vertically disposed stub shafts positioned in spaced relation about said driven shaft lower end portion, a weed cutter on the lower end of each of said stub shafts, said cutters lying in a common horizontal plane, an upstanding housing enclosing said stub shafts, said driven shaft lower end portion, and said cutters and connected to said driven shaft midportion for free rotation about said midportion as an axis, the lower end of said housing being open, said stub shafts being rotatably supported in said housing, means connecting all of said stub shafts to said driven shaft for simultaneous rotation with said driven shaft, a drive shaft carried by said arm, means drivingly connecting said drive shaft to said upper end projecting portion of said driven shaft, a cam trackway on said housing, said trackway embodying a plurality of lobe portions with a dwell portion between adjacent lobe portions, a spring biased roller supported in said trackway and normally releasably engaged with one of said dwell portions for holding said housing against rotation, the portion of said housing enclosing any of said cutters upon encountering a fixed object effecting the release of said roller from said one dwell portion and permitting free rotating movement of said housing portion about said object.

4. A mower attachment comprising an arm adapted to be positioned along one side of a work vehicle frame, means on said arm connecting said arm to said frame side for swinging movement, an upstanding housing operatively connected to said arm for free rotation about a vertical axis, the lower end of said housing being open, a plurality of rotatable weed cutters enclosed within and carried by said housing, said cutters being arranged in spaced relation about said housing axis and lying in a common horizontal plane adjacent the lower open end of said housing, and cooperating releasable latching means on said arm and said housing for holding said housing against rotation, the portion of said housing enclosing any of said cutters upon encountering a fixed object effecting the release of said latching means and permitting free rotating movement of said housing portion about said object.

5. A mower attachment comprising an arm adapted to be positioned along one side of a work vehicle frame, means on said arm connecting said arm to said frame side for swinging movement, spring means carried by said arm and adapted to be operatively connected to said frame side for biasing said arm in a position outwardly of said frame side, an upstanding housing operatively connected to said arm for free rotation about a vertical axis, the lower end of said housing being open, a plurality of rotatable weed cutters enclosed within and carried by said housing, said cutters being arranged in spaced relation about said housing axis and lying in a common horizontal plane adjacent the lower open end of said housing, and cooperating releasable latching means on said arm and said housing for holding said housing against rotation, the portion of said housing enclosing any of said cutters upon encountering a fixed object effecting the release of said latching means and permitting free rotating movement of said housing portion about said object.

References Cited in the file of this patent

UNITED STATES PATENTS

| | | |
|---|---|---|
| 2,727,349 | Wetzel | Dec. 20, 1955 |
| 2,791,081 | Allen et al. | May 7, 1957 |